May 19, 1964
E. A. SCHILLING
3,134,038
COMBINED INDUCTANCE-CAPACITANCE UNIT
FOR PERMANENT MAGNET ALTERNATOR
Filed June 4, 1962
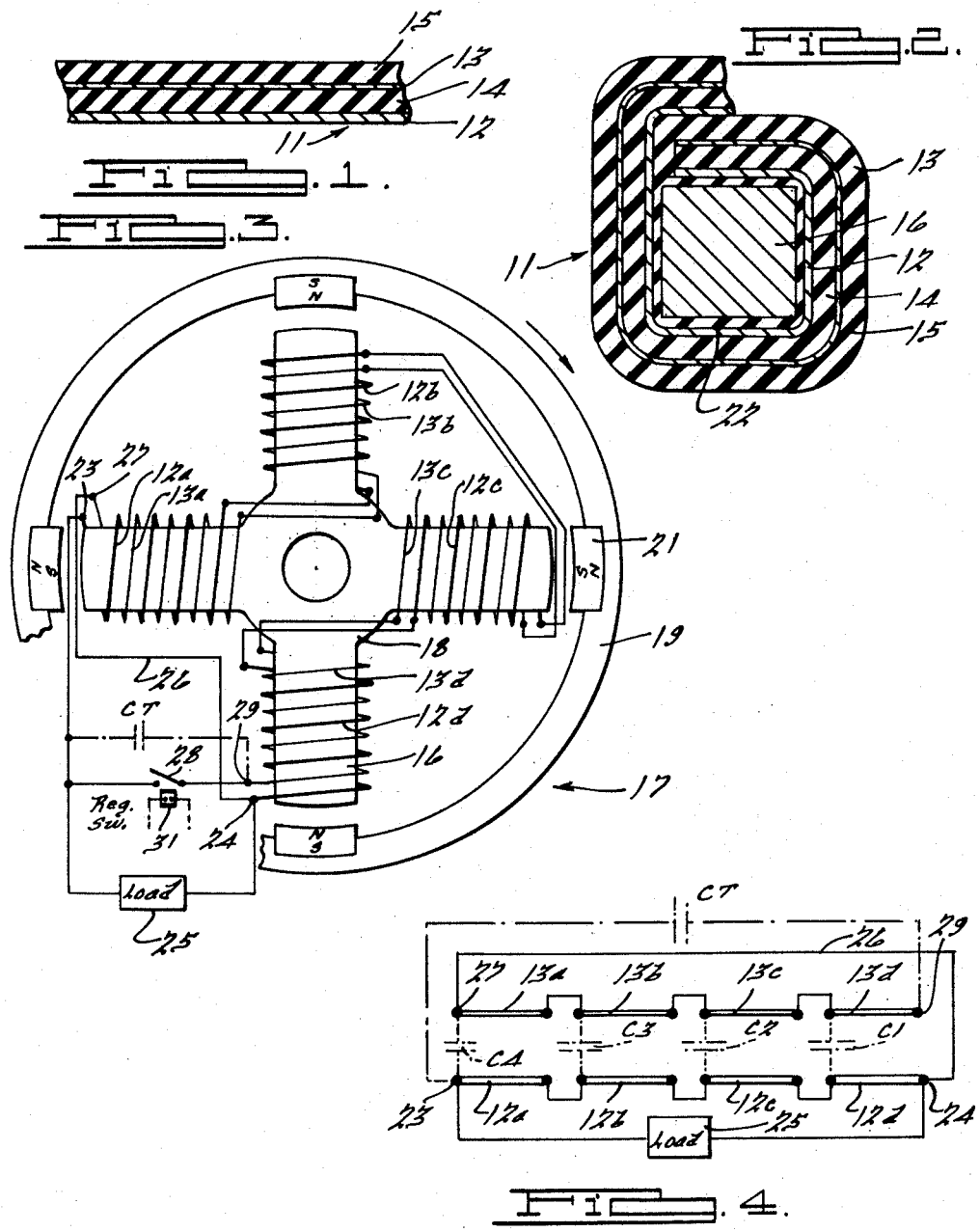
INVENTOR.
Edward A. Schilling.
BY
Harness, Dickey & Pierce
ATTORNEYS.

United States Patent Office 3,134,038
Patented May 19, 1964

3,134,038
COMBINED INDUCTANCE-CAPACITANCE UNIT
FOR PERMANENT MAGNET ALTERNATOR
Edward A. Schilling, Drayton Plains, Mich., assignor to Syncro Corporation, Oxford, Mich., a corporation of Michigan
Filed June 4, 1962, Ser. No. 199,838
5 Claims. (Cl. 310—156)

This invention relates to generators, and more particularly to tuned permanent magnet alternators of the type disclosed and claimed in Patent No. 3,009,092 issued November 14, 1961, to Thomas F. Carmichael.

The above-mentioned patent shows several versions of an alternator in which first and second sets of voltage-generating windings are provided on separate poles of a permanent magnet generator field structure, one set of windings being associated with a capacitance to provide a resonant network which is interrelated with the other set of windings to provide improved output and regulating characteristics.

It is an object of the present invention to provide a novel and improved construction for alternators of this general type which results in a substantial gain in output, increased compactness for the unit, and decreased fabrication costs.

Other objects, features, and advantages of the present invention will become apparent from the subsequent description, taken in conjunction with the accompanying drawings, in which:

FIGURE 1 is a fragmentary cross-sectional view showing the manner of constructing the combined inductance-capacitance unit which forms part of the invention;

FIGURE 2 shows the manner of assembling the combined inductance-capacitance unit on an alternator core pole;

FIGURE 3 is a diagrammatic view of a 4-pole alternator incorporating the invention; and FIGURE 4 is a schematic electrical circuit diagram showing the manner in which the load and tank windings operate to effectively form capacitors.

Briefly, the invention comprises a permanent magnet alternator in which each core pole carries a unit wound as a capacitor using two overlapping foils with suitable dielectric separators. One foil is capable of carrying currents of high density and is used as a load winding, while the other foil is relatively thin and is used as a resonant or tank winding. The load windings are connected in series, as are the tank windings, and the load windings are connected in series with the tank windings. The other ends of the load and tank windings are left open to create a capacitative effect between the windings, and the load is connected across the load windings. This construction not only results in a more compact unit by elimination of the need for an external capacitor, but also provides a gain in output over constructions where the load and tank coils are located on separate poles.

Referring more particularly to the drawings, a portion of a combined inductance-capacitance unit is generally indicated at 11 in FIGURE 1 and comprises two parallel overlapping foils 12 and 13 with dielectric separators 14 and 15 therebetween. Foil 12, which may be termed a load winding, is a copper or aluminum strip conductor capable of carrying currents of high density; in most cases, the use of a copper foil will be found more desirable. Foil 13, which may be referred to as a resonant or tank winding, is a relatively thin copper or aluminum strip conductor. Foil 13 should be as thin as possible to obtain the greatest number of turns of the parallel foils in the winding space available, bearing in mind that both the inductance and capacitance of unit 11 will increase with the number of turns. The thicknesses, widths and lengths of foils 12 and 13 will be calculated to meet circuit requirements.

Dielectric separators 14 and 15 may be of any suitable material and of a thickness and type determined by the voltage to be applied to unit 11.

FIGURE 2 indicates the manner of mounting unit 11 on a core pole 16 of an alternator, the alternator being indicated generally at 17 in FIGURE 3. The alternator is of a permanent magnet type, and is shown as having a stator 18 with four evenly spaced core poles 16 and a rotor 19 surrounding the stator and carrying permanent magnets 21. As shown in FIGURE 2, unit 11 may be wound on a form 22 of dielectric material which fits over pole 16.

FIGURE 3 shows the manner of connecting units 11 on the four poles 16 of core 18. The four load windings 12a, 12b, 12c and 12d are connected in series aiding relation between terminals 23 and 24, and the load 25 is connected across these terminals. The four tank windings 13a, 13b, 13c and 13d are likewise connected in series aiding relation. Since each combined inductance-capacitance unit 11 acts as a capacitor as well as an inductance, electrically connecting the foils as described will place the capacitances formed by the four units 11 in effective parallel relation. This is indicated in FIGURE 4 which shows in phantom lines capacitances $C_1$, $C_2$, $C_3$ and $C_4$ in parallel relation extending between windings 12 and 13. The total capacitance of the 4-pole structure would thus be $C_T = C_1 + C_2 + C_3 + C_4$.

Junction 24 at the outer end of load winding 12d is connected by a wire 26 to a terminal 27 at the outer end of tank winding 13a. The connection between the load and tank windings may be such that they are in series aiding relation or in a manner such that they are electrically opposed. The outer ends of load windings 12a and tank windings 13d are left open, except for the fact that load 25 is connected across the load windings.

In operation, rotation of rotor 19 will cause alternating voltages to be generated in coils 12 and 13. These voltages, together with the capacitative effect described above, will produce an output at load 25 which will vary with the circuit parameters and the rotor speed. The load current will be carried by relatively heavy foils 12 whereas coils 13 will form part of a resonant network, resulting in a relatively high output and also affording regulation advantages of the type described in the aforementioned patent.

Because of the fact that both load and tank coils are mounted on each pole 16, a gain in output will result over equivalent alternators having load and tank coils mounted on separate poles. The increase in output wattage with rotational speed may be regulated with the above-described arrangement due to the presence of a distributed capacitance in the windings, as represented in the drawings by $C_1$ through $C_4$, each of these capacitance values in effect causing a tuned or resonant condition at a different frequency. Elimination of the need for an external capacitor, and the provision of one relatively thin foil in each unit 11, will contribute to the compactness of the alternator.

Should the alternator be used for battery charging purposes, it may be operated in conjunction with a regulating system of the type shown in copending application Serial No. 42,936, filed July 14, 1960, by Edward A. Schilling and assigned to the assignee of the present application. In such case, a normally open regulating switch 28 may be connected between terminal 23 of load coil 12a and terminal 29 of tank coil 13d, seen in FIGURE 3. This normally open switch may be controlled by a relay 31 which is in turn responsive to the terminal voltage of a battery (not shown) being charged by the alternator.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a permanent magnet alternator, a multiple pole core structure, and a combined inductance-capacitance unit on each pole of said core structure, each of said combined inductance-capacitance units comprising a first and second foil wrapped in overlapping relation around said pole, dielectric separators between said foils, the first foil in each unit being of sufficient cross-sectional size to conduct load current, the first foils of said units being connected in series, the outer ends of said series of first foils being adapted for connection across a load, the second foils of said units likewise being connected in series, and a connection between said series of second foils and said series of first foils.

2. In a generator, a multiple pole core structure, a first and second winding on each pole of said core structure, each winding on each pole having inductive properties, the two windings on each pole also having a substantial capacitive coaction, means connecting the first winding on each pole in a first series circuit, means connecting the second windings on said poles in a second series circuit, and a connection between said first series circuit and said second series circuit.

3. The combination according to claim 2, said first windings comprising foil strips of electrically conductive material having sufficient cross-sectional size to carry load current, said second windings comprising strips of electrically conductive material substantially thinner than said first strips and wound in overlapping relation therewith.

4. In a generator, a multiple pole core structure, a combined inductance-capacitance unit on each pole of said core structure, each of said combined inductance-capacitance units comprising a first and second foil strip of electrically conductive material wound in overlapping relation with dielectric spacer strips therebetween, the first foil being of sufficient cross-sectional size to carry a load current, the second foil being substantially thinner than the first foil, means connecting the first foils of said units in series aiding relation, means connecting the second foils of said units in series aiding relation, and means connecting one end of said first foil series and one end of said second foil series.

5. In a permanent magnet alternator, a rotor having permanent magnets, a stator comprising a multiple core structure, a combined inductance-capacitance unit on each pole of said core structure, each of said combined inductance-capacitance units comprising a first and second foil strip of electrically conductive material wound in overlapping relation with dielectric spacer strips therebetween, the first foil being of sufficient cross-sectional size to carry a load current, the second foil being substantially thinner than the first foil, means connecting the first foils of said units in series aiding relation, means connecting the second foils of said units in series aiding relation, and means connecting one end of said first foil series and one end of said second foil series.

References Cited in the file of this patent

UNITED STATES PATENTS

| | | |
|---|---|---|
| 1,460,390 | O'Leary | July 3, 1923 |
| 2,521,513 | Gray | Sept. 5, 1950 |
| 3,009,092 | Carmichael | Nov. 14, 1961 |
| 3,092,767 | Schilling | June 4, 1963 |

FOREIGN PATENTS

| | | |
|---|---|---|
| 465,619 | Great Britain | May 11, 1937 |